UNITED STATES PATENT OFFICE.

ROBERT CECIL MORAN, OF RIDLEY PARK, PENNSYLVANIA, ASSIGNOR TO E. I. DU PONT DE NEMOURS & COMPANY, OF WILMINGTON, DELAWARE, A CORPORATION OF DELAWARE.

PROCESS OF PREPARING DINITRODIPHENYLAMIN.

1,401,631. Specification of Letters Patent. Patented Dec. 27, 1921.

No Drawing. Application filed December 5, 1918. Serial No. 265,389.

*To all whom it may concern:*

Be it known that I, ROBERT C. MORAN, of Ridley Park, in the county of Delaware and in the State of Pennsylvania, have invented a certain new and useful Improvement in Processes of Preparing Dinitrodiphenylamin, and do hereby declare that the following is a full, clear, and exact description thereof.

My invention relates particularly to a process for preparing dinitrodiphenylamin in an advantageous manner.

Hitherto, in accordance with one method of preparing dinitrodiphenylamin, it has been customary to add two molecular proportions of anilin to one molecular proportion of dinitrochlorbenzol, and then to heat the mixture slightly until the reaction begins, thus forming a mixture of dinitrodiphenylamin and anilin hydrochlorid. In producing dinitrodiphenylamin in this way, however, there was a large evolution of heat which it was necessary to check by cooling, as for example, by drowning in water. In this way, a hard mass was obtained which it was necessary to grind and extract with water in order to recover the valuable anilin hydrochlorid. In accordance with another method of preparing the same, in which the evolution of heat was automatically controlled, and in which the formation of a hard mass is obviated, the same proportions of anilin and dinitrochlorbenzol were caused to form an emulsion with a body of water, which was afterward raised to the reaction temperature by the introduction of live steam, the materials being agitated throughout the process. In the process just described the water serves to control the temperature of the reaction, and the dinitrodiphenylamin produced separates out as a granular material which is insoluble in the water present.

I have discovered that dinitrochlorbenzene or any dinitro-halogen-substituted benzene compound condenses with anilin, in the dry state, in the presence of any weak alkaline agent, as for example, sodium bicarbonate or sodium carbonate, to form dinitrodiphenylamin. In this way, a reduction of 50% of the anilin used is obtained, the necessity of controlling the heat factor is obviated, the necessity of recovering the valuable by-product, anilin hydrochlorid, is avoided, and iron apparatus may be used for carrying out the reaction. The object of my invention is to provide a process in which these advantages are secured over previous processes.

Further objects of my invention will appear from the detailed description thereof contained hereinafter.

While my invention is capable of being carried out in many different ways, for the purpose of illustration I shall describe only certain ways of carrying out the same hereinafter.

For example, I proceed as follows:

One molecular proportion, that is to say, 100 parts by weight of 2-4-dinitro 1-chlorbenzene, and one molecular proportion, that is to say, 46 parts by weight of anilin, and one molecular proportion, that is to say, 41.5 parts by weight of sodium carbonate or sodium bicarbonate are introduced into an iron container equipped with a revolving plow stirrer of any suitable character. While the contents are being continually agitated, the temperature thereof is raised to 90 to 100° C., and maintained at this point until the reaction is completed. The condensation proceeds smoothly with the evolution of carbon dioxid, and with the separation of crystalline 2-4-dinitrodiphenylamin which is prevented from caking during the formation thereof, by the graining action of the revolving stirrer. The reaction proceeds according to the following equation:

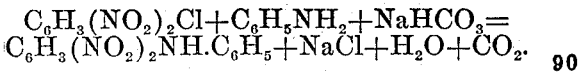

$$C_6H_3(NO_2)_2Cl + C_6H_5NH_2 + NaHCO_3 = C_6H_3(NO_2)_2NH.C_6H_5 + NaCl + H_2O + CO_2.$$

The total time required in carrying out the process is about one hour. The scarlet-red pulverulent dinitrodiphenylamin is then extracted with water to remove the sodium chlorid which is not a valuable by-product. The remaining dinitrodiphenylamin has a melting point of 150° to 152° C.

While I have described my invention above in detail, I wish it to be understood that many changes may be made therein without departing from the spirit of the same.

I claim:

1. The process of forming dinitrodiphenylamin consisting in combining dinitrochlorbenzol with anilin and a sodium salt of carbonic acid at about 90 to 100° C. in the absence of solvents and added water.

2. The process of forming dinitrodiphenylamin consisting in combining dinitrohalogenbenzol with anilin and an alkali metal salt of carbonic acid at about 90 to 100° C. in the absence of solvents and added water.

In testimony that I claim the foregoing I have hereunto set my hand.

ROBERT CECIL MORAN.

Witnesses:
 HENRY P. HASTINGS,
 A. BARTRAM DUTTON.